United States Patent
Onoda et al.

(10) Patent No.: US 12,535,108 B2
(45) Date of Patent: Jan. 27, 2026

(54) CONSTANT VELOCITY UNIVERSAL JOINT AND MANUFACTURING METHOD OF CONSTANT VELOCITY UNIVERSAL JOINT

(71) Applicant: JTEKT CORPORATION, Kariya (JP)

(72) Inventors: Kaname Onoda, Aichi (JP); Koki Watanabe, Aichi (JP)

(73) Assignee: JTEKT CORPORATION, Kariya (JP)

( * ) Notice: Subject to any disclaimer, the term of this patent is extended or adjusted under 35 U.S.C. 154(b) by 305 days.

(21) Appl. No.: 18/260,149

(22) PCT Filed: Feb. 18, 2021

(86) PCT No.: PCT/JP2021/006121
§ 371 (c)(1),
(2) Date: Jun. 30, 2023

(87) PCT Pub. No.: WO2022/176105
PCT Pub. Date: Aug. 25, 2022

(65) Prior Publication Data
US 2024/0060539 A1     Feb. 22, 2024

(51) Int. Cl.
*F16D 3/224* (2011.01)
*F16D 3/223* (2011.01)

(52) U.S. Cl.
CPC .... *F16D 3/224* (2013.01); *F16D 2003/22313* (2013.01); *F16D 2250/0061* (2013.01);
(Continued)

(58) Field of Classification Search
CPC .......... F16D 3/224; F16D 2003/22313; F16D 2250/0061; Y10S 464/906; Y10T 29/49945; Y10T 403/4966
(Continued)

(56) References Cited

U.S. PATENT DOCUMENTS 2,986,188 A * 5/1961 Karp ..................... F16B 37/044
29/525
4,760,752 A * 8/1988 Wield ................. F16H 57/0025
403/282
(Continued)

FOREIGN PATENT DOCUMENTS

CN          1910380 A       2/2007
CN       101346552 A        1/2009
(Continued)

OTHER PUBLICATIONS

International Search Report Issued Mar. 23, 2021, in PCT/JP2021/006121, filed on Feb. 18, 2021, 3 pages.
(Continued)

*Primary Examiner* — Greg Binda
(74) *Attorney, Agent, or Firm* — Oblon, McClelland, Maier & Neustadt, L.L.P.

(57) ABSTRACT

An inner joint member has, on an opening portion side of an outer joint member, a holding portion that has a bottomed concave shape into which a sleeve for supporting a boot covering the opening portion is press-fitted, and a relief portion that is provided on part of a convex outer spherical surface at the opening portion side, and that has a smaller diameter than an outer diameter of the convex outer spherical surface corresponding to a press-fitting range of the holding portion into which the sleeve is press-fitted.

9 Claims, 3 Drawing Sheets

(52) U.S. Cl.
CPC ...... *Y10S 464/906* (2013.01); *Y10T 29/49945* (2015.01); *Y10T 403/4966* (2015.01)

(58) Field of Classification Search
USPC .............................. 464/145; 29/525; 403/282
See application file for complete search history.

(56) References Cited

U.S. PATENT DOCUMENTS

| | | | |
|---|---|---|---|
| 6,708,589 B2* | 3/2004 | Brinker | ................... F16D 65/12 |
| 7,704,149 B2 | 4/2010 | Yamazaki et al. | |
| 8,029,373 B2 | 10/2011 | Izumino et al. | |
| 8,182,352 B2 | 5/2012 | Kobayashi | |
| 8,864,591 B2 | 10/2014 | Sugiyama et al. | |
| 10,508,692 B2 | 12/2019 | Mabe et al. | |
| 2008/0096678 A1 | 4/2008 | Yamazaki et al. | |
| 2009/0258716 A1 | 10/2009 | Izumino et al. | |
| 2010/0113168 A1 | 5/2010 | Kobayashi | |
| 2013/0252748 A1 | 9/2013 | Sugiyama et al. | |
| 2017/0241482 A1 | 8/2017 | Mabe et al. | |

FOREIGN PATENT DOCUMENTS

| | | |
|---|---|---|
| CN | 102209857 A | 10/2011 |
| CN | 102575720 A | 7/2012 |
| DE | 195 14 868 C1 | 5/1996 |
| JP | 62-39025 U1 | 3/1987 |
| JP | 7-317791 A | 12/1995 |
| JP | 2005-106233 A | 4/2005 |
| JP | 2007-139095 A | 6/2007 |
| JP | 2008-232293 A | 10/2008 |
| JP | 2013-194895 A | 9/2013 |
| JP | 2017-150549 A | 8/2017 |

OTHER PUBLICATIONS

Combined Chinese Office Action and Search Report issued Sep. 29, 2025, (client received on Oct. 14, 2025) in corresponding Chinese Patent Application No. 202180090315.8 (with English Translation and English Translation of Category of Cited Documents), 18 pages.

* cited by examiner

CONSTANT VELOCITY UNIVERSAL JOINT AND MANUFACTURING METHOD OF CONSTANT VELOCITY UNIVERSAL JOINT

TECHNICAL FIELD

The present invention relates to a constant velocity universal joint and a manufacturing method of the constant velocity universal joint.

BACKGROUND ART

Conventionally, there is known a constant velocity universal joint disclosed in Patent Document 1, for example. In a conventional constant velocity universal joint, a sleeve is press-fitted and fixed to an inner joint member. In this case, when the sleeve is press-fitted, a diameter of a convex outer spherical surface of the inner joint member may increase and interfere with a concave inner spherical surface of a cage in some cases, and there is a possibility of hindering smooth operation of the constant velocity universal joint. Accordingly, in a conventional constant velocity universal joint, the diameter of a portion of the concave inner spherical surface of the cage is increased cylindrically, to suppress contact with the convex outer spherical surface of the inner joint member of which the diameter is increased.

RELATED ART DOCUMENTS

Patent Documents

Patent Document 1: Japanese Unexamined Patent Application Publication No. 2013-194895 (JP 2013-194895 A)

SUMMARY OF THE INVENTION

Problem to be Solved by the Invention

Now, when the diameter of the concave inner spherical surface of the cage is increased cylindrically, as in the conventional constant velocity universal joint, area of contact of the convex outer spherical surface of the inner joint member with the concave inner spherical surface of the cage decreases when the constant velocity universal joint is operated. As a result, wear due to contact between the convex outer spherical surface of the inner joint member and the concave inner spherical surface of the cage increases, resulting in abrasion powder being generated, and clearance between the convex outer spherical surface of the inner joint member and the concave inner spherical surface of the cage increasing, and there is a possibility that this will hinder smooth operation of the constant velocity universal joint.

It is an object of the present invention to provide a constant velocity universal joint that enables smooth operation even when the sleeve is press-fitted, and a method for manufacturing the constant velocity universal joint, through a simple structure.

Means for Solving the Problem

A constant velocity universal joint, including an outer joint member formed in a bottomed cylindrical shape having an opening portion on one side in an axial direction and a bottom portion on another side in the axial direction, and having a plurality of outer retaining grooves formed along a circumferential direction on an inner periphery that has a concave inner spherical surface, an inner joint member disposed on an inner side of the outer joint member, and having a plurality of inner retaining grooves formed along the circumferential direction on an outer periphery that has a convex outer spherical surface, a plurality of retaining members that rolls in the outer retaining grooves and the inner retaining grooves, respectively, and transmits torque between the outer joint member and the inner joint member, and a cage that is formed in an annular shape and is disposed between the concave inner spherical surface of the outer joint member and the convex outer spherical surface of the inner joint member, and in which a plurality of window portions respectively accommodating the retaining members is formed in the circumferential direction, in which the inner joint member includes a holding portion that has a bottomed concave shape, and into which a sleeve that supports a boot covering the opening portion is press-fitted on the opening portion side of the outer joint member, and a relief portion that is provided on part of the convex outer spherical surface on the opening portion side and that has a smaller diameter than an outer diameter of the convex outer spherical surface, corresponding to a press-fitting range in which the sleeve is press-fitted into the holding portion.

According to this, part of the convex outer spherical surface of the inner joint member of the constant velocity universal joint can be provided with the relief portion having a smaller diameter than the outer diameter of the convex outer spherical surface. Accordingly, when the sleeve is press-fitted into the press-fitting range with respect to the holding portion of the inner joint member, interference between the convex outer spherical surface and the relief portion of the inner joint member, and the concave inner spherical surface of the cage, can be suppressed from occurring in states other than a joint angle being zero degrees, even though the relief portion that is smaller in diameter than the convex outer spherical surface increases in diameter.

Also, decrease in area of contact between the convex outer spherical surface of the inner joint member and the concave inner spherical surface of the cage can be suppressed, by the diameter of the relief portion increasing. Thus, wear due to contact between the convex outer spherical surface of the inner joint member and the concave inner spherical surface of the cage can be reduced, and generation of abrasion powder and increase in the clearance between the convex outer spherical surface of the inner joint member and the concave inner spherical surface of the cage can be suppressed, thereby enabling smooth operations of the constant velocity universal joint to be maintained.

MODES FOR CARRYING OUT THE INVENTION

[1. Configuration of Constant Velocity Universal Joint 100]

Figure 1:
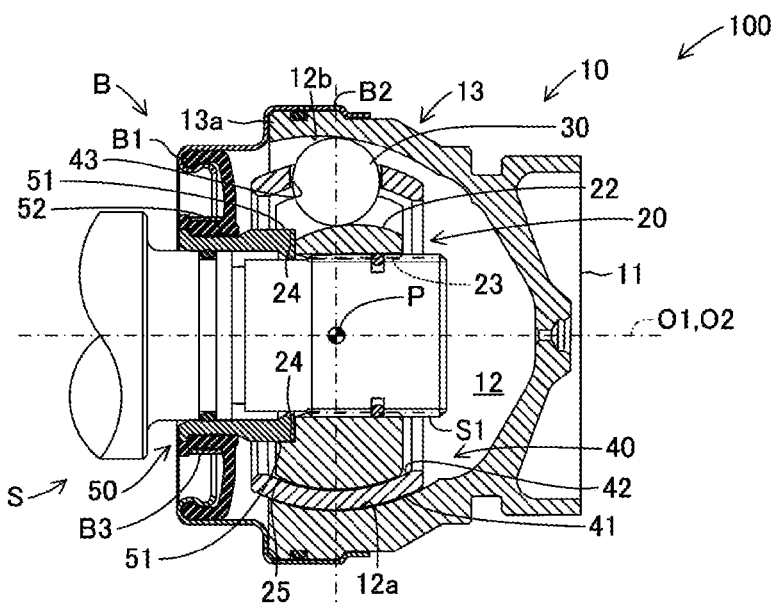
FIG. 1 is a cross-sectional view of a constant velocity universal joint in a state in which a propeller shaft is assembled thereto, illustrating a state in which a joint angle is zero degrees.
Figure 2:
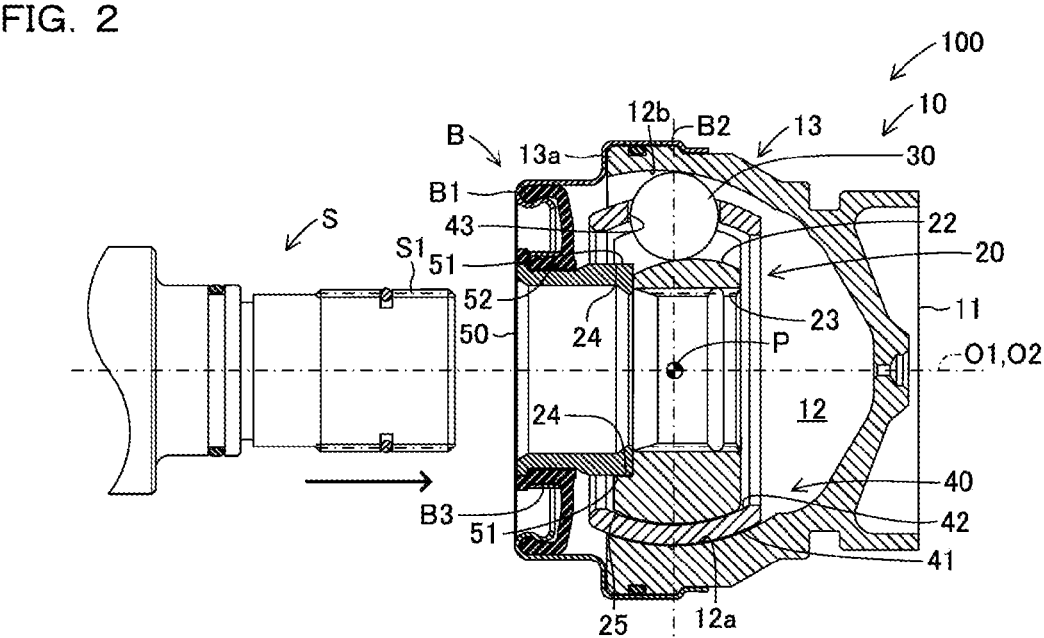
FIG. 2 is a diagram for describing a state of assembling the propeller shaft to the constant velocity universal joint.

A constant velocity universal joint 100 according to the present example is, as illustrated in FIG. 1, a joint center fixed ball type (so-called Rzeppa type) constant velocity universal joint. As illustrated in FIG. 2, the constant velocity universal joint 100 according to the present example has a propeller shaft S of an automobile inserted therein and assembled thereto. The constant velocity universal joint 100 according to the present example transmits rotation (and torque) of the propeller shaft S to, for example, a differential of a vehicle that is omitted from illustration.

Figure 3:
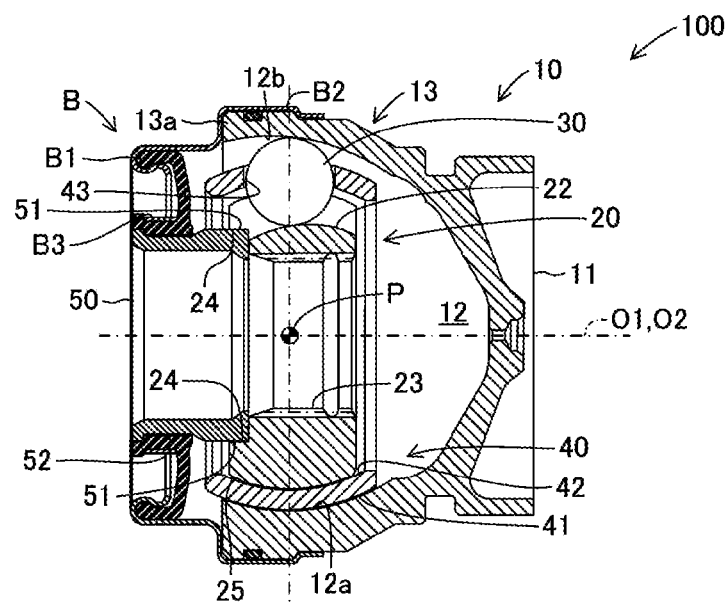
FIG. 3 is a cross-sectional view for describing a configuration of the constant velocity universal joint.

The constant velocity universal joint 100 primarily includes an outer joint member 10, an inner joint member 20, a plurality of balls 30 serving as retaining members, a cage 40, and a sleeve 50, as illustrated in FIG. 3. Also, in the constant velocity universal joint 100 according to the present example, a boot B is assembled (attached) between an inner periphery of the outer joint member 10 and an outer periphery of the sleeve 50, covering an opening portion of the outer joint member 10.

The outer joint member 10 according to the present example is formed as a bottomed cylinder (cup-like) that has an opening portion on a left side in FIG. 3 (one side in an axial line O1 direction) and a bottom portion on a right side in FIG. 3 (other side in the axial line O1 direction). A linking portion 11 is integrally formed on an outer side of the bottom portion of the outer joint member 10 (on the right side in FIG. 3) so as to extend in the direction of the axial line O1. The linking portion 11 is linked so as to transmit rotation (and torque) to a differential of the vehicle (omitted from illustration).

An inner periphery 12 of the outer joint member 10 has a concave inner spherical surface 12a and outer ball grooves 12b serving as outer retaining grooves. The concave inner spherical surface 12a is located at a great part of a middle portion of the inner periphery 12 of the outer joint member 10 in the direction of the axial line O1. The concave inner spherical surface 12a is formed of part of a spherical surface that is traced with a joint center P as the center thereof. That is to say, the portion of the concave inner spherical surface 12a that is the longest in a radial direction from the axial line O1 of the outer joint member 10 is the middle portion of the concave inner spherical surface 12a in the direction of the axial line O1. That is to say, the concave inner spherical surface 12a decreases in diameter from the middle portion in the direction of the axial line O1 toward the opening portion side, and also decreases in diameter from the middle portion in the direction of the axial line O1 toward the bottom portion side.

The outer ball groove 12b is formed extending in the direction of the axial line O1 of the outer joint member 10. A plurality of the outer ball grooves 12b is formed at equidistant intervals along a circumferential direction of the outer joint member 10. Note that the direction of the axial line O1 of the outer joint member 10, i.e., the axial direction, means a rotation axis direction of the outer joint member 10.

A retaining portion 13a for retaining a support member B2 that holds a boot main body B1 of the boot B is formed on the opening portion side of an outer periphery 13 of the outer joint member 10. Note that an accommodating groove for accommodating a seal member, such as an O-ring or the like, for example, is formed in the retaining portion 13a so as to retain the support member B2 in a liquid-tight manner.

Figure 4:
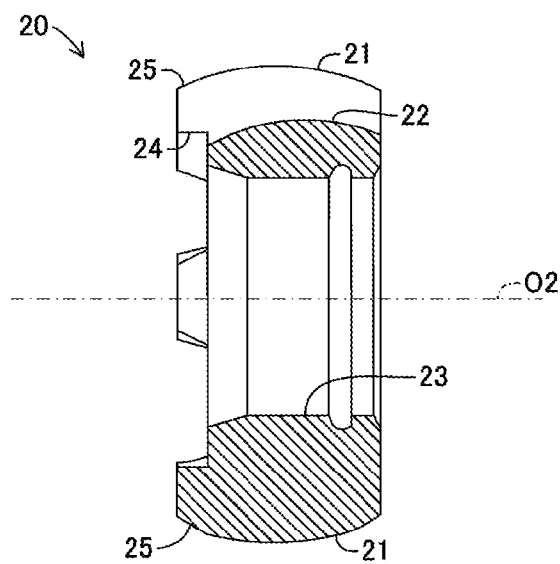
FIG. 4 is a cross-sectional view for describing a configuration of an inner joint member.

The inner joint member 20 is formed in an annular shape and is disposed on an inner side of the outer joint member 10, as illustrated in FIG. 3 and FIG. 4. A convex outer spherical surface 21 is formed over an entire outer periphery of the inner joint member 20 along an axial line O2. Specifically, the convex outer spherical surface 21 of the inner joint member 20 is formed of part of a spherical surface that is traced with the joint center P as the center thereof under torque transmission.

Also, a plurality of inner ball grooves 22 serving as inner retaining grooves is formed on the outer periphery of the inner joint member 20, extending in a direction of the axial line O2 of the inner joint member 20. The number of the inner ball grooves 22 is the same as the number of the outer ball grooves 12b, and the inner ball grooves 22 are formed at equidistant intervals in the circumferential direction. Further, the inner ball grooves 22 are each formed in a generally arcuate concave shape, and more specifically in a Gothic arc shape formed by connecting two arcs.

An internal spline 23 extending in the direction of the axial line O2 is formed on an inner peripheral surface of the inner joint member 20. The internal spline 23 is inserted into and assembled to the propeller shaft S, by being fitted (meshed) with an external spline S1 (see FIG. 1 and FIG. 2) thereof. In this case, the propeller shaft S is inserted into and linked to the inner joint member 20, so that a central axis thereof is aligned with a rotation axis of the inner joint member 20. Here, the direction of the axial line O2 of the inner joint member 20 means a direction passing through a central axis of the inner joint member 20, i.e., the direction of the rotation axis of the inner joint member 20.

Figure 5:
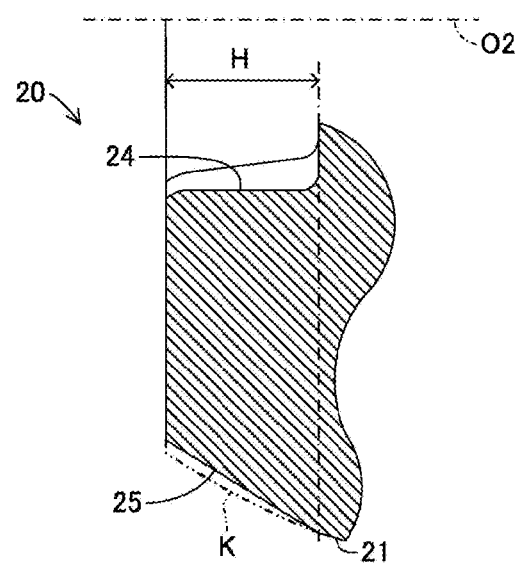
FIG. 5 is a diagram for describing a configuration of a holding portion and a relief portion of the inner joint member in FIG. 4.

Also, the inner joint member 20 has a holding portion 24 that holds the sleeve 50 by the sleeve 50 being press-fitted thereto, as illustrated in FIG. 4. The holding portion 24 has an opening with a smaller diameter than an outer diameter of the sleeve 50, and is formed in a bottomed concave shape having a predetermined press-fitting range H, as illustrated in FIG. 5. Now, the sleeve 50 is press-fitted into the holding portion 24 before the inner joint member 20 is assembled to the cage 40, for example.

Further, as illustrated in FIG. 4, the inner joint member 20 is formed with a relief portion 25 in the circumferential direction at an end on the opening portion side of the convex outer spherical surface 21 (left side in FIG. 4). The relief portion 25 is provided to suppress increase in the diameter in a radially outward direction from occurring at the convex outer spherical surface 21, from material flow due to press-fitting of the sleeve 50 into the holding portion 24, and more specifically, to suppress the diameter from becoming larger than an outer diameter of the convex outer spherical surface 21. As illustrated in FIG. 5, the relief portion 25 is provided in a range of the convex outer spherical surface 21 that corresponds to the press-fitting range H provided in the direction of the axial line O2. The relief portion 25 is formed chamfered, for example, so as to have a smaller diameter than an imaginary surface K (indicated by a two-dotted dashed line in FIG. 5) in which the convex outer spherical surface 21 is extended to the opening portion side.

Accordingly, when the sleeve 50 is press-fitted into the holding portion 24, even if the diameter of the relief portion 25 increases, the increase in diameter is only up to no more than the outer diameter of the convex outer spherical surface 21. Thus, by providing the relief portion 25 with a small diameter, there is no portion that protrudes beyond the outer diameter of the convex outer spherical surface 21 due to the sleeve 50 being press-fitted, and accordingly the inner joint member 20 can smoothly turn relative to the cage 40, which will be described later.

As illustrated in FIG. 3, the balls 30, which are retaining members in the present example, are each disposed so as to be interposed between the outer ball grooves 12b of the outer joint member 10 and the inner ball grooves 22 of the inner joint member 20 facing the outer ball grooves 12b. Each of the balls 30 engages with a corresponding one of the outer ball grooves 12b and a corresponding one of the inner ball grooves 22, so as to be capable of rolling, in the circumferential direction (around the axial line O1 of the outer joint member 10 or around the axial line O2 of the inner joint member 20). The balls 30 therefore transmit torque between the outer joint member 10 and the inner joint member 20.

Figure 7:
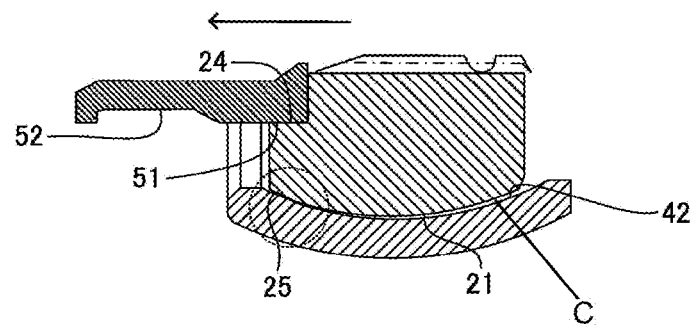
FIG. 7 is a diagram for describing operation of the constant velocity universal joint when the joint angle is other than zero degrees.

The cage 40 is formed in an annular shape, as illustrated in FIG. 3. An outer peripheral surface of the cage 40 is a convex outer spherical surface 41 corresponding to the concave inner spherical surface 12a of the outer joint member 10. On the other hand, an inner peripheral surface of the cage 40 is a concave inner spherical surface 42 corresponding to the convex outer spherical surface 21 of the inner joint member 20. The cage 40 is disposed with a predetermined clearance C between the concave inner spherical surface 12a of the outer joint member 10 and the convex outer spherical surface 21 of the inner joint member 20, as shown in FIG. 7.

The cage 40 is formed such that a length (width) thereof in the direction of the axial line O1 (or the axial line O2) is longer than the concave inner spherical surface 12a of the outer joint member 10, and also is longer than the length (width) of the inner joint member 20 in the direction of the axial line O2. That is to say, as illustrated in FIG. 1, in a state in which a joint angle is zero degrees, the convex outer spherical surface 41 of the cage 40 faces the entirety of the concave inner spherical surface 12a of the outer joint member 10 in the direction of the axial line O1, and also, the concave inner spherical surface 42 of the cage 40 faces the entirety of the convex outer spherical surface 21 and the relief portion 25 of the inner joint member 20 in the direction of the axial line O2. This enables the concave inner spherical surface 42 of the cage 40 to face the convex outer spherical surface 21 and the relief portion 25 of the inner joint member 20 even when the joint angle is other than zero degrees.

The cage 40 also has a plurality of window portions 43. The window portions 43 are rectangular through holes that are formed at equidistant intervals in the circumferential direction. The number of the window portions 43 of the cage 40 that are formed is the same as the number of the balls 30. Each window portion 43 accommodates one ball 30.

Figure 6:
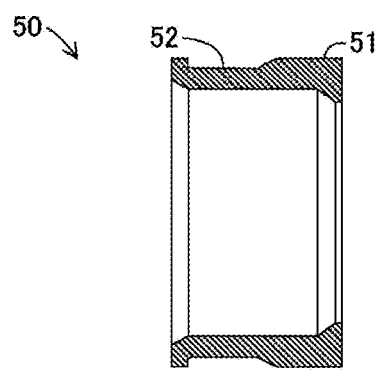
FIG. 6 is a diagram for describing a configuration of a sleeve that is press-fitted into the holding portion in FIG. 4.

The sleeve 50 is formed cylindrically, as illustrated in FIG. 6. The sleeve 50 has, on an outer peripheral surface thereof, a press-fitting portion 51 that is press-fitted into the holding portion 24 of the inner joint member 20, and a holding recessed portion 52 that holds an inner peripheral portion of the boot main body B1 of the boot B, which will be described later. Also, the propeller shaft S is inserted through an inner periphery of the sleeve 50.

The press-fitting portion 51 has an outer diameter that is slightly larger than an inner diameter of the holding portion 24. Also, the press-fitting portion 51 is provided so as to be longer than the press-fitting range H corresponding to a depth of the holding portion 24. Thus, when the press-fitting portion 51 of the sleeve 50 is press-fitted into the holding portion 24, the relief portion 25 provided on the convex outer spherical surface 21 of the inner joint member 20 increases in diameter in the radially outward direction to no more than the outer diameter of the convex outer spherical surface 21, as described above (press-fitting process of manufacturing method).

The holding recessed portion 52 has an outer diameter that is slightly larger than an inner diameter of the boot main body B1. As illustrated in FIG. 3, the holding recessed portion 52 supports the boot main body B1 so that the boot main body B1 is gripped between the holding recessed portion 52 and the support member B2 of the boot B assembled to an outer peripheral surface of the outer joint member 10. Accordingly, the holding recessed portion 52 supports the boot main body B1 in a liquid-tight manner, with a sealing overlap area formed as to an inner peripheral surface of the boot main body B1.

As illustrated in FIG. 3, the boot B has the boot main body B1 that is formed as a disc, the support member B2 for supporting the boot main body B1, and a clamp B3. The boot main body B1 is molded by a known molding method such as blow molding, injection molding, or the like, using synthetic resin, rubber, or the like. In a state in which the propeller shaft S is assembled, the boot main body B1 covers and seals the opening portion side of the outer joint member 10 in a liquid-tight manner. The support member B2 supports the boot main body B1 in an unremovable manner in a state of being retained by the retaining portion 13a formed on the outer periphery 13 of the outer joint member 10. The clamp B3 fixes the boot main body B1 to the sleeve 50 so as to have a sealing overlap area.

The inner joint member 20, the balls 30, and the cage 40 are disposed in a closed space formed by the outer joint member 10 and the boot B (more specifically, the boot main body B1). Also, a lubricant such as grease or the like is sealed in the closed space. Accordingly, situations in which the lubricant such as grease or the like sealed in the closed space leaks from inside of the outer joint member 10 to the outside through the opening portion, and water, mud, and so forth intrude from the outside through the opening to the inside the outer joint member 10, can be suppressed from occurring.

[2. Operations of Constant Velocity Universal Joint 100]

Next, operations of the constant velocity universal joint 100 configured as described above will be described. When the joint angle is set to a value other than zero degrees, the inner joint member 20 and the cage 40 move toward the opening portion side of the outer joint member 10 in conjunction with rotation of the propeller shaft S, as indicated by an arrow in FIG. 7. In this case, the cage 40 moves toward the opening portion side along the concave inner spherical surface 12a of the outer joint member 10, and the convex outer spherical surface 21 and the relief portion 25 of the inner joint member 20 move along the concave inner spherical surface 42 of the cage 40 toward the opening portion side, as illustrated in FIG. 7.

Now, as described above, the diameter of the relief portion 25 increases due to the sleeve 50 being press-fitted into the holding portion 24 at the press-fitting range H, to substantially the outer diameter of the convex outer spherical surface 21 but no more than the outer diameter of the convex outer spherical surface 21. In this case, when the inner joint member 20 moves toward the opening portion side, the relief portion 25 can also come into contact with the concave inner spherical surface 42 of the cage 40 in conjunction with the above-described movement, in addition to the convex outer spherical surface 21, as indicated encircled by a dashed line in FIG. 7.

That is to say, in a state in which the sleeve 50 is press-fitted, the relief portion 25 of which the diameter is increased can be regarded as a part of the convex outer spherical surface 21, and in addition to the convex outer spherical surface 21, the relief portion 25 also slides over the concave inner spherical surface 42 of the cage 40. That is to say, in this case, the relief portion 25 also frictionally slides over the concave inner spherical surface 42 of the cage 40, and accordingly the area of contact with the concave inner spherical surface 42 can be increased, as compared to a case in which the convex outer spherical surface 21 alone frictionally slides over the concave inner spherical surface 42 of the cage 40.

Thus, even when the relief portion 25 is provided on the inner joint member 20, the area of contact with the concave inner spherical surface 42 of the cage 40 does not decrease, and as a result, increase in wear that occurs due to decrease in area of contact can be suppressed. Accordingly, in the constant velocity universal joint 100, generation of abrasion powder due to operations can be reduced, and smooth operations can be maintained over a long period of time. Also, a clearance set between the convex outer spherical surface 21 and the relief portion 25 of the inner joint member 20, and the concave inner spherical surface 42 of the cage 40 is suppressed from becoming large, and accordingly abnormal noises when operating (e.g., rattling, etc.) can also be suppressed from occurring.

Further, before the propeller shaft S is assembled thereto, the constant velocity universal joint 100 according to the present example is in a state in which the sleeve 50 is press-fitted into the holding portion 24 and the boot B is assembled to the sleeve 50, in advance. Accordingly, when assembling the propeller shaft S to the constant velocity universal joint 100, all that is necessary is to insert the propeller shaft S into the constant velocity universal joint 100 for assembly thereof. That is to say, there is no need to separately assemble the boot B, for example, after the propeller shaft S is assembled. Therefore, with the constant velocity universal joint 100 according to the present example, assembly work of the propeller shaft S can be easily completed.

As can be understood from the above description, according to the constant velocity universal joint 100 of the present example, the relief portion 25 having a smaller diameter than the outer diameter of the convex outer spherical surface 21 of the inner joint member 20, more specifically, having a smaller diameter than an outer diameter of the imaginary surface K in which the convex outer spherical surface 21 is extended toward the opening portion, can be provided on a part of the convex outer spherical surface 21. Thus, when the sleeve 50 is press-fitted into the press-fitting range H with respect to the holding portion 24 of the inner joint member 20, interference between the convex outer spherical surface 21 and the relief portion 25 of the inner joint member 20, and the concave inner spherical surface 42 of the cage 40, can be suppressed from occurring in states other than the joint angle being zero degrees, even though the relief portion 25 that is smaller in diameter than the convex outer spherical surface 21 increases in diameter.

Also, decrease in the area of contact between the convex outer spherical surface 21 of the inner joint member 20 and the concave inner spherical surface 42 of the cage 40 can be suppressed, by the diameter of the relief portion 25 increasing to substantially the outer diameter of the convex outer spherical surface 21. Thus, wear due to contact between the convex outer spherical surface 21 of the inner joint member 20 and the concave inner spherical surface 42 of the cage 40 can be reduced, and also generation of abrasion powder and increase in the clearance between the convex outer spherical surface 21 of the inner joint member 20 and the concave inner spherical surface 42 of the cage 40 can be suppressed, thereby enabling smooth operations of the constant velocity universal joint 100 to be maintained over a long period of time.

[3. Others]

In the above-described present example, a case in which the relief portion 25 of the inner joint member 20 is formed by linear chamfering of the convex outer spherical surface 21 is exemplified. However, the relief portion 25 is not limited to being formed by linear chamfering of the convex outer spherical surface 21, and can be formed by circular arc chamfering of the convex outer spherical surface 21, for example. Also, the relief portion 25 is not limited to being formed by chamfering of the convex outer spherical surface 21, and may be formed in a stepped shape, for example, when sufficient detachment withstanding strength can be ensured for the sleeve 50 that is press-fitted.

Furthermore, in the present example described above, a case in which the outer joint member 10 has the outer ball grooves 12b formed on the inner periphery 12 as outer retaining grooves parallel to the direction of the axial line O1 is exemplified. However, the outer ball grooves, which are the outer retaining grooves, do not have to be formed parallel to the direction of the axial line O1, and the outer ball grooves may be formed as cross grooves. Note that when the outer ball grooves are formed as cross grooves, the inner ball grooves serving as the inner retaining grooves of the inner joint member are also formed as cross grooves. In this case as well, the same effects as in the present example described above can be obtained.

DESCRIPTION OF THE REFERENCE NUMERALS

10 Outer joint member
11 Linking portion
12 Inner periphery
12a Concave inner spherical surface
12b Outer ball groove (outer retaining groove)
13 Outer periphery
13a Retaining portion
20 Inner joint member
21 Convex outer spherical surface
22 Inner ball groove (inner retaining groove)
23 Internal spline
24 Holding portion
25 Relief portion
30 Ball (retaining member)
40 Cage
41 Convex outer spherical surface
42 Concave inner spherical surface
43 Window portion
100 Constant velocity universal joint
B Boot
B1 Seal main body
B2 Support member
B3 Clamp
H Press-fitting range
K Virtual surface

The invention claimed is:

1. A constant velocity universal joint comprising:
an outer joint member formed in a bottomed cylindrical shape having an opening portion on one side in an axial direction and a bottom portion on another side in the axial direction, and having a plurality of outer retaining grooves formed along a circumferential direction on an inner periphery that has a concave inner spherical surface;

an inner joint member disposed on an inner side of the outer joint member, and having a plurality of inner retaining grooves formed along the circumferential direction on an outer periphery that has a convex outer spherical surface;

a plurality of retaining members that rolls in the outer retaining grooves and the inner retaining grooves, respectively, and transmits torque between the outer joint member and the inner joint member; and a cage that is formed in an annular shape and is disposed between the concave inner spherical surface of the outer joint member and the convex outer spherical surface of the inner joint member, and in which a plurality of window portions respectively accommodating the retaining members is formed in the circumferential direction, wherein the inner joint member includes a holding portion that has a bottomed concave shape, and into which a sleeve that supports a boot covering the opening portion is press-fitted on the opening portion side of the outer joint member, and a relief portion that is provided on part of the convex outer spherical surface on the opening portion side and that has a smaller diameter than an outer diameter of the convex outer spherical surface, corresponding to a press-fitting range in which the sleeve is press-fitted into the holding portion.

2. The constant velocity universal joint according to claim 1, wherein a diameter of the relief portion is no more than the outer diameter of the convex outer spherical surface in a state in which the sleeve is press-fitted into the press-fitting range of the holding portion.

3. The constant velocity universal joint according to claim 2, wherein:

an inner periphery of the cage has a concave inner spherical surface corresponding to the convex outer spherical surface of the inner joint member;

a predetermined clearance is set between the convex outer spherical surface of the inner joint member and the concave inner spherical surface of the cage; and when the inner joint member and the cage move toward the opening portion side of the outer joint member in a state in which the sleeve is press-fitted into the holding portion, the relief portion having a diameter that is increased slides over the concave inner spherical surface of the cage.

4. The constant velocity universal joint according to claim 1, wherein the relief portion is formed by chamfering the convex outer spherical surface.

5. A manufacturing method of the constant velocity universal joint according to claim 1, comprising a press-fitting process of press-fitting the sleeve into the holding portion of the inner joint member.

6. The constant velocity universal joint according to claim 1, wherein an other part of the convex outer spherical surface of the inner joint member slides over an inner peripheral surface of the cage.

7. The constant velocity universal joint according to claim 1, wherein an other part of the convex outer spherical surface of the inner joint member slides over an inner peripheral surface of the cage, and the relief portion is spaced apart from the inner peripheral surface of the cage in a state where the sleeve is not press-fitted into the holding portion of the inner joint member.

8. The constant velocity universal joint according to claim 1, wherein an intermediate portion in the axial direction of the convex outer spherical surface of the inner joint member slides over an inner peripheral surface of the cage, and a portion on a side opposite to the opening portion side of the convex outer spherical surface of the inner joint member has a clearance between the convex outer spherical surface and the inner circumferential surface of the cage.

9. The constant velocity universal joint according to claim 1, wherein an inner periphery of the cage includes a concave inner spherical surface corresponding to the convex outer spherical surface of the inner joint member, and an other part of the convex outer spherical surface of the inner joint member slides over the concave inner spherical surface of the cage.

* * * * *